(12) United States Patent
Venkataramana et al.

(10) Patent No.: US 12,438,880 B2
(45) Date of Patent: Oct. 7, 2025

(54) CLOUD SECURITY GROUP RULE MANAGEMENT VIA LOG PROCESSING

(71) Applicant: Capital One Services, LLC, McLean, VA (US)

(72) Inventors: Dwaraka Venkataramana, Chantilly, VA (US); Amy Miao, Arlington, VA (US); Alex Schwartzberg, Manalapan, NJ (US); Anteneh Shiferaw, South Riding, VA (US); Naziul Talukder, Rosedale, NY (US); Jason Redisch, Fairfax, VA (US); James George, III, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 100 days.

(21) Appl. No.: 18/402,446

(22) Filed: Jan. 2, 2024

(65) Prior Publication Data
US 2025/0220022 A1 Jul. 3, 2025

(51) Int. Cl.
*H04L 9/40* (2022.01)
*H04L 29/06* (2006.01)

(52) U.S. Cl.
CPC .......... *H04L 63/104* (2013.01); *H04L 63/205* (2013.01)

(58) Field of Classification Search
CPC ..... H04L 63/104; H04L 63/205; H04L 63/10; H04L 63/108; H04L 63/20; G06F 21/57; G06F 21/577
See application file for complete search history.

(56) References Cited

U.S. PATENT DOCUMENTS 10,148,701 B1 * 12/2018 Hecht ................... G06F 9/455

\* cited by examiner

*Primary Examiner* — Edward Zee
(74) *Attorney, Agent, or Firm* — Banner & Witcoff, Ltd.

(57) ABSTRACT

Methods, systems, and apparatuses are described herein for automatically managing security group rules in a cloud environment by analyzing utilization of each of the security group rules based on packet logs so as to reduce attack vector possibilities. A computing device may receive a first log comprising a plurality of log entries that each indicate one or more packet flows associated with a security group attached to a cloud resource. A plurality of security group rules may be sorted in an order based on their permissiveness. The computing device may identify, for each log entry of the plurality of log entries, a corresponding security group rule of the plurality of security group rules by iteratively processing, based on traffic pattern matching characteristics and the order, the sorted plurality of security group rules to identify a least permissive security group rule. Rules tagged as unused and/or shadowed may be removed.

20 Claims, 7 Drawing Sheets

CLOUD SECURITY GROUP RULE MANAGEMENT VIA LOG PROCESSING

FIELD OF USE

Aspects of the disclosure relate generally to network management in cloud environments. More particularly, aspects of the disclosure relate to managing security group rules in a cloud environment by processing logs to analyze utilization of security group rules and steer towards a least permissive security posture.

BACKGROUND

Remote computing resources (e.g., computing resources in the "cloud") often comprise real or virtualized memory, processors, networking components, and the like. In turn, such remote computing resources can receive and transmit data over networks. For example, a virtual web server executing in the cloud might be configured to transmit webpages and corresponding assets to web browsers on various user devices. That said, like local resources, remote computing resources are thus vulnerable to attacks by malicious actors. Such attacks might comprise attempts to steal ("exfiltrate") data, to destroy resources, or the like. To protect against such attacks, access to various remote resources might be organized into different security groups, and transmissions to/from such groups might be governed by one or more security group rules. Those rules might be similar to rules for firewalls governing local resources. For example, a first security group rule may limit which Internet Protocol (IP) addresses can send data to a security group, whereas another security group rule may reject transmissions via certain ports. Given the popularity of remote computing resources, the wide variety of possible attacks on those resources, and similar concerns, security groups can be governed by a staggering number of different security group rules. Indeed, some security groups may have thousands, if not tens of thousands, of different rules (although certain implementations, such as those implemented by Amazon Web Services provided by Amazon.com, Inc. of Seattle, Washington, are limited to 100 rules). In turn, management of those security group rules can be prohibitively difficult. Moreover, the complexity of these rules (and their tendency to overlap) can undesirably slow down network transmissions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to automatically managing security group rules in a cloud environment by analyzing utilization of each of the security group rules based on packet logs so as to reduce attack vector possibilities. As will be detailed in greater detail below, a computing device might log packet flows associated with a security group, determine security group rules applicable to that security group, sort those rules based on their permissiveness, and then identify, for each entry in the log of packet flows, one or more corresponding security group rules. To make such an association, the computing device might determine the least permissive (e.g., most restrictive) and/or more specific rule applicable to the entry in the log of packet flows. In turn, this might allow the computing device to identify circumstances where security group rules are not used at all (e.g., do not correspond to any of the entries in the log) and/or where security group rules might apply to log entries but are effectively not applied to those entries because a more restrictive rule applied first (a circumstance referred to herein as being "shadowed" by the more restrictive security group rule). In this way, the computing device processes complex log data in a particular manner to track security group rule utilization in a manner that can identify unused and/or shadowed (e.g., superseded) rules, which can provide an opportunity for those security group rules to be disabled (e.g., deleted, removed from the list of applicable rules, or the like). Disabling those security group rules can significantly improve security, as it reduces attack vector possibilities by, e.g., prioritizing least permissive security group rules over more permissive security group rules. Moreover, disabling such security group rules can speed up the packet filtering process overall.

More particularly, a computing device may receive, from a log database, a first log comprising a plurality of log entries that each indicate one or more packet flows associated with a security group in the cloud environment. As part of receiving the first log, the computing device may receive a second log comprising a second plurality of log entries that each indicate one or more packet flows associated with a plurality of different security groups in the cloud environment and process the log data to identify the first log. Such a log entry might be received from an Elastic Network Interface (ENI) of an Amazon Virtual Private Cloud (VPC), such that the one or more packet flows might be associated with data transmissions associated with the VPC. The computing device may determine a plurality of security group rules for the security group of the cloud environment, wherein the plurality of security group rules limit one or both of inbound network traffic for the security group, or outbound traffic for the security group. To determine these rules, the computing device may query a database for rules associated with the security group. The computing device may sort the plurality of security group rules into an order based on a permissiveness of the plurality of security group rules. The computing device may then identify, for each log entry of the plurality of log entries, a corresponding security group rule of the plurality of security group rules by iteratively processing, based on the order, the sorted plurality of security group rules to identify a least permissive security group rule that permitted a packet flow corresponding to the log entry. The computing device may modify the first log to add, for each log entry of the plurality of log entries, an identification of the corresponding security group rule and determine, based on the modified first log, a first security group rule of the plurality of security group rules that is not associated with any log entry of the plurality of log entries. The computing device may then disable the first security group rule.

As part of the process described above, the computing device may generate a second log that indicates, for each security group rule, whether a particular security group rule was used. For example, the computing device may determine, based on the modified first log, a second log that indicates, for each of the plurality of security group rules, whether a corresponding security group rule was indicated in the first log. This second log might be useful for identifying whether certain rules are used. Moreover, the second log might be usable to identify circumstances where one security group rule is shadowed by another, more restrictive security group rule. For example, the computing device may determine, based on the modified first log, a second security group rule of the plurality of security group rules that is more permissive than a third security group rule of the plurality of security group rules, determine that both the second security group rule and the third security group rule correspond to a first log entry, and then add, to the second log, an indication that the second security group rule is shadowed by the third security group rule. Such shadowed rules might be ultimately disabled. For example, the computing device may, based on the indication that the second security group rule is shadowed by the third security group rule, disable the second security group rule.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, security group rules for remote resources (e.g., cloud servers) can be difficult to manage, which can introduce security vulnerabilities. For example, a security group might have many different applicable security group rules, with some rules taking greater priority over others, and with many security groups attached to a given cloud entity. Despite the number of security group rules, this complexity can increase the overall number of attack vectors on a security group. After all, the complexity might result in some transmissions being allowed even if those transmissions are undesirable. To reduce this problem, a least-permissive rule approach might be taken for security groups. In other words, the overall set of rules might be reduced to only the least permissive rules that are actually required'. To effectuate this process, aspects described herein describe monitoring flow logs and uniquely associating entries in those flow logs with corresponding rules. In this way, the actual utilization of rules can be tracked, unused rules can be removed, and least permissive rules can be prioritized as desired.

As an example of how the present disclosure may operate, an administrator may configure a security group with many different security group rules that each specify, for example, IP address ranges and/or ports which may be accepted under certain circumstances. In some implementations (such as in the Amazon Web Services environment), a default rule may be configured to reject all communications, with additional rules specifying which (if any) communications are accepted. The list of those rules may be sorted by permissiveness and/or specificity, such that less permissive/more specific rules are given priority over more permissive/less specific rules. Over time, packet transmissions to and from that security group may be monitored and logged. Then, a computing device may process the log to identify, for each entry, one or more rules that allowed and/or rejected the corresponding packet transmissions. The log might be modified to append, to the log, information about such applicable rules. Then, the log may be processed to identify rules that are used, unused, and/or shadowed (that is, applicable to a particular entry, but superseded by a less permissive/more specific rule). Unused and/or shadowed rules might be ultimately disabled (e.g., deleted). As a result, the overall number of security group rules may be lowered (which, standing alone, aids in efficiency) in a manner which is more restrictive and thus lowers the number of attack vectors on the security group.

The particular disclosure might be particularly useful in the context of Amazon Web Services (AWS) cloud computing platforms provided by Amazon, Inc. of Seattle, Washington. AWS security groups and security group rules enable traffic flow in a network. With that said, AWS's security group settings lack the ability to natively track utilization of rules when those rules are used. The present disclosure remedies this problem by using VPC logs in AWS: specifically, those logs are compared against security group rules such that the flow logs can be enriched with security group and/or rule information. In this way, a computing device can track utilization of rules over time, allowing for unused and/or improperly configured rules to be modified as desired. In turn, this process steers towards a least permissive approach through a mapping algorithm that reduces attack vector possibilities.

Aspects described herein act as a practical implementation of computing devices because it improves the computer security process in a manner that makes computers faster and less vulnerable to attack. As described above, by processing flow logs and using those flow logs to analyze rules, the overall set of rules can be reduced. This improves computing device speed because the same effect (e.g., protection of computing resources) can be effectuated faster (e.g., because the computing device has to check fewer rules for each packet). This can also better protect computing devices because the reduction of overall rules in favor of more restrictive rules removes possible attack vectors. Further still, the processes described herein could not be performed by a human being at least because such processes involve a huge volume of data (e.g., flow logs) that rapidly changes such that—by the time any human being purported to even try to understand the data, much less associate it with rules—the data would be old, and huge volumes of additional data would have been added.

Before discussing these concepts in greater detail, however, several examples of a computing device that may be used in implementing and/or otherwise providing various aspects of the disclosure will first be discussed with respect to FIG. 1.

Figure 1:
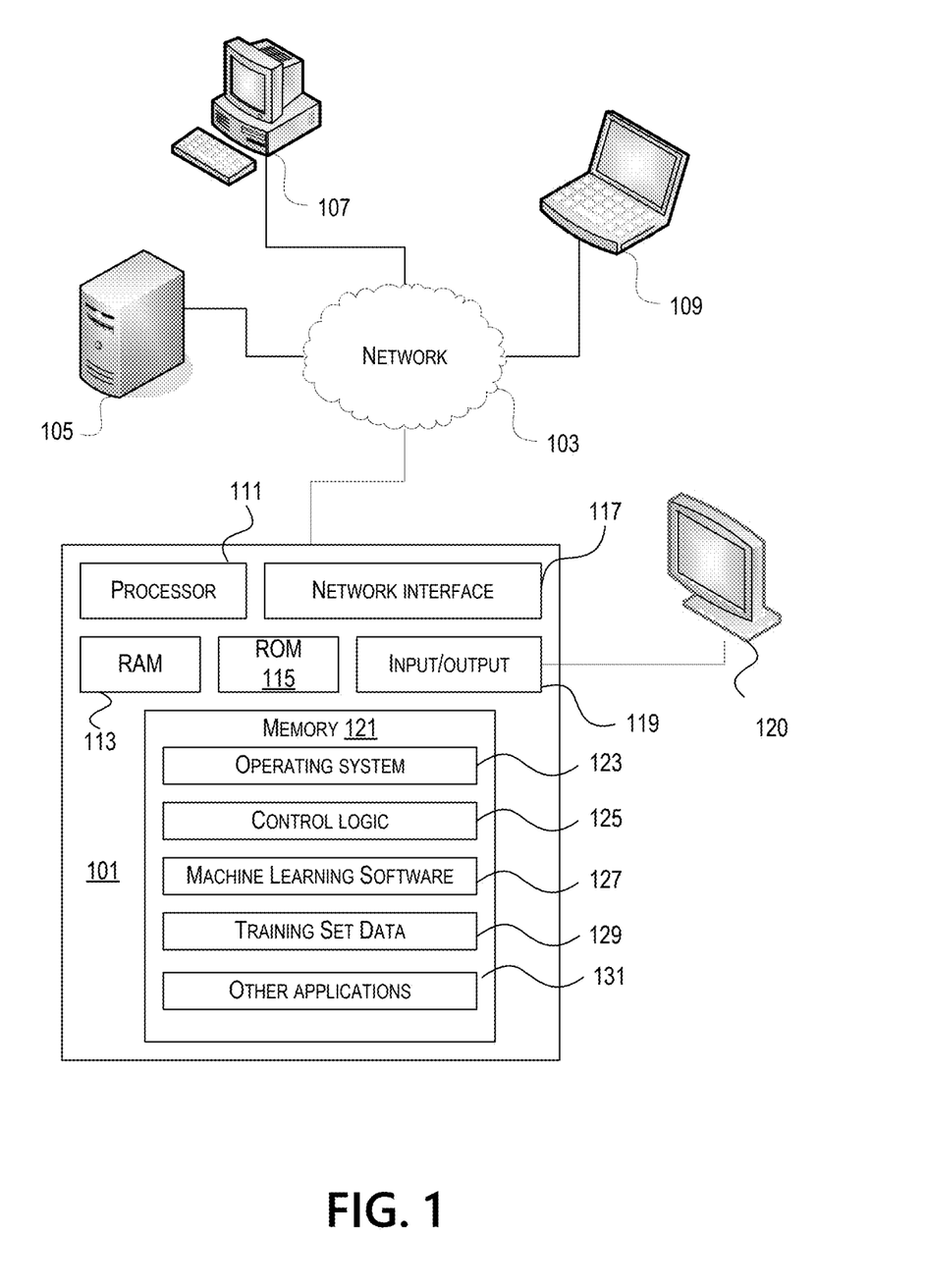
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python or JavaScript. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
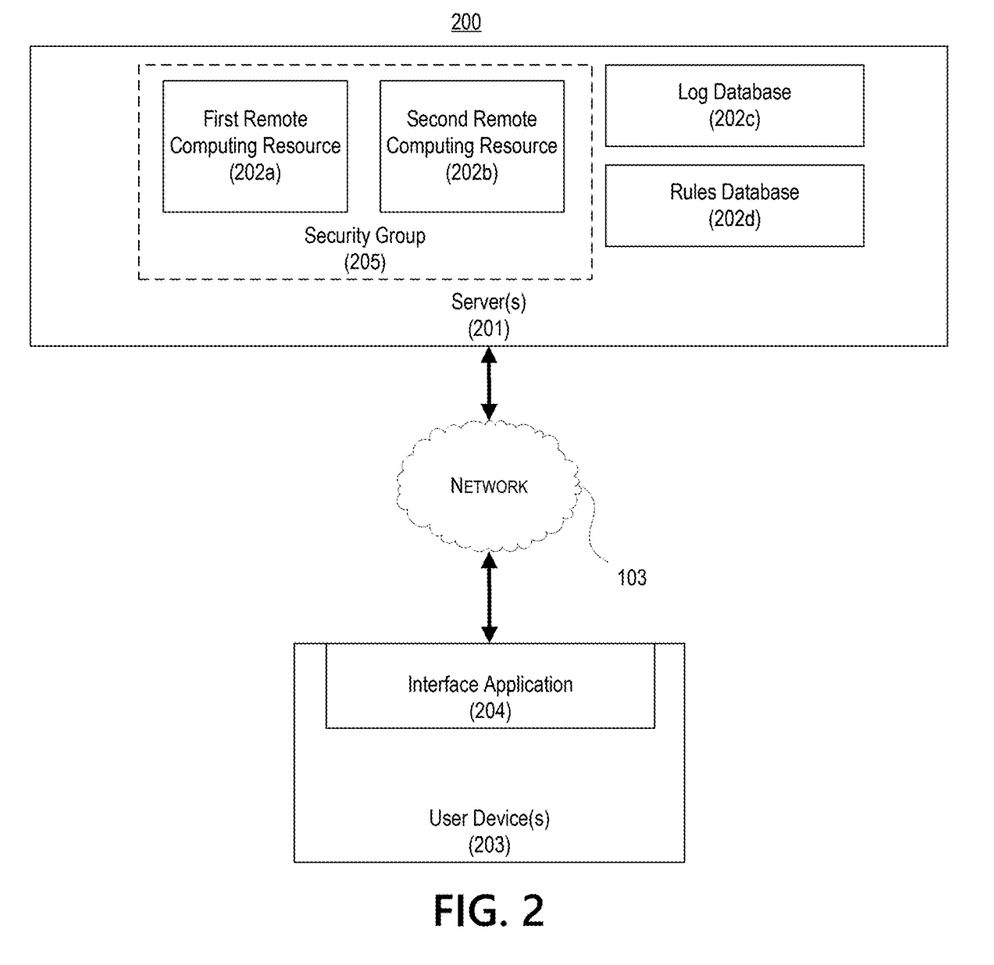
FIG. 2 depicts a system comprising servers (including remote resources in security groups) and user devices.

FIG. 2 depicts a system 200 comprising one or more servers 201 (that a first remote computing resource 202a and a second remote computing resource 202b in a security group 205 as well as a log database 202c and a rules database 202d) communicatively coupled, via the network 103, to one or more user devices 203. The one or more user devices 203 are shown as comprising (e.g., executing) an interface application 204. The one or more servers 201 and/or the one or more user devices 203 may comprise computing devices, such as computing devices that comprise one or more processors and memory storing instructions that, when executed on the one or more processors, cause the performance of one or more steps. The one or more servers 201 and/or the one or more user devices 203 may comprise any of the devices depicted with respect to FIG. 1, such as one or more of the computing devices 101, 105, 107, and/or 109.

The first remote computing resource 202a and the second remote computing resource 202b are shown as being part of the security group 205. Remote computing resources, such as the first remote computing resource 202a and the second remote computing resource 202b, may be any logical or virtual collection of computing resources such as processors, memory, storage, network interfaces, or the like. For example, a remote computing resource may comprise a virtual server on the cloud. As another example, a remote computing resource may comprise a server hosted by a remote server hosting service, a web hosting company, or the like.

Remote computing resources may be associated with security groups, such as the security group 205. Such security groups may be used to filter traffic for computing resources. For example, security groups might be defined to delineate computing resources tasked with particularly sensitive tasks, such as user authorization, transaction processing, or the like, and to control traffic to those resources. In turn, different security groups might have different rules. For example, the security group 205 might involve remote computing resources that handle particularly sensitive data and thus may be governed by a large quantity of strict rules, whereas another security group might involve remote computing resources that simply deliver webpages and thus might be governed by a smaller quantity of relatively more permissive rules.

The log database 202c may store a log of packet transmissions (e.g., packet flows) to and from one or more security groups and/or one or more remote computing resources, such as the security group 205, the first remote computing resource 202a, and/or the second remote computing resource 202b. Such a log may comprise a plurality of entries that each correspond to transmissions to and/or from one or more security groups and/or one or more remote computing resources. To perform such logging, the log database 202c may itself, or using additional devices (not necessarily depicted in FIG. 2), actively monitor network communications between the one or more servers 201 and the network 103. For example, the log database 202c may be communicatively coupled to a gateway or a similar networking device which routinely reports logged transmissions to the log database 202c. An example of such a log is provided below with respect to FIG. 4.

The rules database 202d may store one or more security group rules which define rules governing data transmissions to and/or from one or more security groups and/or one or more remote computing resources, such as the security group 205, the first remote computing resource 202a, and/or the second remote computing resource 202b. The rules may comprise conditions which govern whether a particular transmission should be allowed to continue to its intended destination, should be rejected, should be captured, should be encapsulated, or the like. Such conditions may be based on data in the header of one or more packets (e.g., flow identifiers, IP address, port, five-tuple) and/or data in the payload of one or more packets (e.g., whether a packet contains certain untrusted information, such as malicious code).

Different security group rules may have different levels of permissiveness. Some rules may be relatively permissive in that they allow a wide variety of transmissions (and/or reject a lesser variety of transmissions), whereas some rules may be relatively less permissive in that they allow a narrower variety of transmissions (and/or reject a greater variety of transmissions). Broadly, more specific rules are preferred over less specific rules, and less permissive rules are preferred over more permissive rules, as doing so provides fewer pathways for transmissions to occur and thus lowers the possibility of attack vectors on a network. This is why, as will be described below, rules in the rules database 202d might be sorted by permissiveness and/or specificity.

The user devices 203 may comprise devices such as smartphones, laptops, desktops, tablets, and the like, and may be capable of using the interface application 204 to communicate with the one or more servers 201. In turn, a user of the user devices 203 may be able to add rules to the rules database 202d, view information about the logs stored by the log database 202c, and/or access the first remote computing resource 202a and/or the second remote computing resource 202d.

Discussion will now turn to explaining how a computing device may automatically manage security group rules in a cloud environment by analyzing utilization of each of the security group rules based on packet logs and/or flow logs so as to reduce attack vector possibilities.

Figure 3:
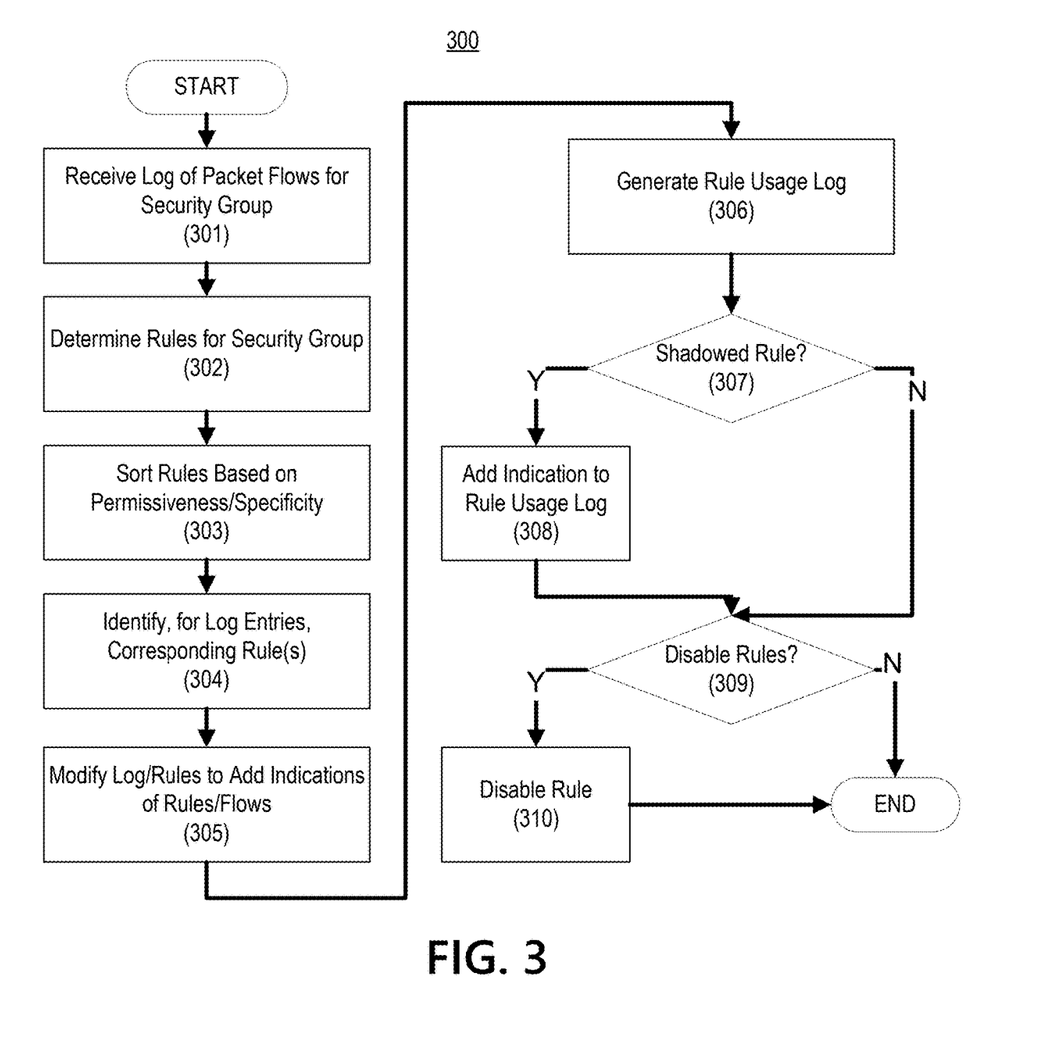
FIG. 3 depicts a flow chart comprising steps which may be performed to automatically manage security group rules in a cloud environment.

FIG. 3 depicts a flow chart depicting a method 300 comprising steps which may be performed by at least one of the one or more servers 201. A computing device may comprise one or more processors and memory storing instructions that, when executed by the one or more processors, cause performance of one or more of the steps of FIG. 3. One or more non-transitory computer-readable media may store instructions that, when executed by one or more processors of a computing device, cause the computing device to perform one or more of the steps of FIG. 3. Additionally and/or alternatively, one or more of the devices depicted in FIG. 2, such as the one or more servers 201 and/or the one or more user devices 203, may be configured to perform one or more of the steps of FIG. 3. For simplicity, the steps below will be described as being performed by a single computing device; however, this is merely for simplicity, and any of the below-referenced steps may be performed by a wide variety of computing devices, including multiple computing devices.

As a brief introduction, step 301, step 302, and step 303 describe data collection and cleaning processes whereby information about packet transmissions for a security group and security group rules applicable to that security group are collected. Practically speaking, such data is voluminous and often difficult to collect: for instance, the log data alone can be extremely long and voluminous, requiring significant processing power.

In step 301, the computing device may receive a log of packet flows for a security group. That log may comprise information about packet transmissions (e.g., individual packets, packet flows) between a security group (e.g., the security group 205 and/or any remote computing resources in the security group 205) and other devices (e.g., other devices on the network 103). For example, the computing device may receive, from a log database, a first log comprising a plurality of log entries that each indicate one or more packet flows associated with a security group in the cloud environment. As part of receiving the log of packet flows for the security group, the computing device may retrieve the log from a particular aspect of the one or more servers 201. For example, the computing device may receive the log by retrieving, from an Elastic Network Interface (ENI) of an Amazon Virtual Private Cloud (VPC), the log. In such a circumstance, each of the one or more packet flows may be associated with data transmissions associated with the VPC.

As part of receiving the log of packet flows for the security group, the computing device may receive a larger log of packet flows for many different security groups. The log database 202c may store a wide variety of logs for a large number of remote computing resources and/or security groups, such that the computing device may need to filter such a log to identify log entries corresponding to a particular security group and/or remote computing resource. In turn, the computing device might process (e.g., filter) that larger log before performing further steps as part of the method 300. For example, the computing device may receive a second log comprising a second plurality of log entries that each indicate one or more packet flows associated with a plurality of different security groups in the cloud environment and then process the log data to identify the first log.

In step 302, the computing device may determine rules for the security group. For example, the computing device may determine a plurality of security group rules for the security group of the cloud environment. The plurality of security group rules may limit one or both of inbound network traffic for the security group, or outbound traffic for the security group. The plurality of security group rules may be determined by querying a server, such as the rules database 202*d*. For example, the computing device may determine the plurality of security group rules for the security group by querying a database for rules associated with the security group.

In step 303, the computing device may sort the security group rules determined in step 302 by permissiveness and/or specificity. This process may be generally intended to sort the security group rules in an order that places less permissive rules over more permissive rules and more specific rules over more general rules. For example, the computing device may sort the plurality of security group rules into an order based on a permissiveness of the plurality of security group rules. An example of sorted security group rules is discussed below with respect to FIG. 5B.

Sorting by permissiveness may comprise placing less permissive rules higher than more permissive rules. In such a context, permissiveness might correspond to the likelihood that a packet transmission might be allowed to proceed to its destination (instead of being rejected). For example, a rule that rejects all but a single IP address might be said to be less permissive than a rule that rejects all but a range of IP addresses because it permits a narrower range of packets from reaching their destination, such that the former might be placed higher than the latter on a list. As another example, a rule that rejects packets using asterisks (e.g., 192.168.*.*) might be said to be less permissive than a rule that rejects only a particular IP address (e.g., 192.168.1.1) because it permits a narrower range of packets from reaching their destination, such that the former might be placed higher than the latter on a list.

Sorting by specificity may comprise placing more specific rules higher than less specific rules. In such a context, specificity might correspond to how specifically (e.g., narrowly) a condition allows packets. For example, a rule allowing packets having the destination IP address 192.168.1.1 is more specific than a rule allowing packets having the destination IP address 192.168.1.* because the former is far more specific about the conditions in which allowing occurs. As another example, a rule rejecting packets with a specific payload (e.g., malicious code) is more specific than a rule rejecting packets directed to a particular IP address because the rule is far more detailed as to the conditions to reject the packet.

The combination of permissiveness and specificity may thereby bias the ordered list of security group rules in a manner such that rules that reject a greater variety of packets (and/or rules that allow a lesser variety of packets) are preferred. This is intentional, as it reduces possible attack vectors on security groups. As will be detailed below, one goal of the present disclosure may be to narrowly constrain the scope of allowable network transmissions so as to better protect remote network resources.

As a preliminary introduction, step 304, step 305, and step 306 involve steps taken to process the data collected by the computing device and ultimately analyze rule utilization. In short, by iteratively processing the ordered list of rules against each log entry, the computing device can identify the least permissive/most specific rule applicable to that log entry. In the aggregate, this process can identify not only which rules are entirely unused, but also rules that are "shadowed"—that is, applicable to some log entries, but effectively superseded by more specific/less permissive rules.

In step 304, the computing device may identify, for each of the log entries, one or more corresponding rules. This step may entail determining, for each entry in the log from step 301, the first rule that matches in the ordered list of security group rules. For example, the computing device may identify, for each log entry of the plurality of log entries, a corresponding security group rule of the plurality of security group rules by iteratively processing, based on the order, the sorted plurality of security group rules to identify the least permissive security group rule that permitted a packet flow corresponding to the log entry.

The process described with step 304 indicates the importance of the sorting of the rules in step 303. By sorting the rules in the manner described in step 303, in step 304, the computing device can iterate down the list of rules, from most restrictive/most specific to least restrictive/least specific, to find the first rule that matches the entry. In turn, any applicable rules below that rule in the list might be said to be shadowed in that the rules might have applied but for the earlier rule applying. This ordering makes the process quite a bit quicker, which is valuable given the large quantity of data (e.g., the large quantity of logged data and the large quantity of rules) in question.

In step 305, the computing device may modify the log to add indications of the rules identified in step 304. One particularly efficient way that the computing device may store information about how rules correspond to log entries is to append, to rules, an identification of one or more corresponding log entries. For instance, in the Amazon Web Services environment, the index of VPC flow logs that a particular SecurityGroupRule matches may be added to each SecurityGroupRule. In practice, this is a quite speedy and useful procedure in the Amazon Web Services environment. Another way that the computing device may store information about how rules correspond to log entries is to append the log entry itself with an identification of the rule(s) identified as part of step 304. For example, the computing device may modify the first log to add, for each log entry of the plurality of log entries, an identification of the corresponding security group rule. An example of such a modified log is discussed below with respect to FIG. 6.

In step 306, the computing device may generate a rule usage log. In addition to and/or alternative to step 305, the computing device may create a log that indicates, for each rule, whether it was used, unused, shadowed, or the like. For example, the computing device may determine, based on the modified first log and/or the information about flows stored and associated with rules, a second log that indicates, for each of the plurality of security group rules, whether a corresponding security group rule was indicated in the first log. An example of a security group rule utilization log is discussed below with respect to FIG. 7.

As a preliminary introduction, step 307, step 308, step 309, and step 310 provide examples of how the analysis from previous steps may be used to make security group rules significantly more efficient. As will be described below, this includes logging and/or disabling shadowed rules, disabling unused rules, and the like.

In step 307, the computing device may determine whether one or more rules have been shadowed. As described above, shadowing may involve a circumstance where a rule might have applied, but a less permissive/more specific rule applied instead. Such a circumstance might originate where a shadowed rule is lower than an applicable rule on the ordered list determined in step 303. Additionally and/or alternatively, determining whether a rule is shadowed may comprise processing the rule usage log. For example, the computing device may determine, based on the rules (as modified to indicate one or more corresponding flows) and/or a modified first log, a second security group rule of the plurality of security group rules that is more permissive than a third security group rule of the plurality of security group rules. In such a circumstance, information that a rule is shadowed might be added to the rules themselves (e.g., as metadata), to a list of shadowed rules, and/or to the flow log. If one or more rules have been shadowed, the method 300 proceeds to step 308. Otherwise, the method 300 proceeds to step 309.

In step 308, the computing device may add an indication of the one or more shadowed rules to the rule usage log. If a rule is shadowed in one scenario, but is the sole existence of the rule is necessary for other logs to occur, it is kept. As such, shadowed rules are not necessarily worth disabling for merely being shadowed: for example, while a rule might be shadowed with respect to one flow log entry, it might itself be the primary rule applicable to another flow log entry. Stated differently, rules might be shadowed under different circumstances, and the fact that they are sometimes shadowed does not necessarily mean that the rule should be disabled. In turn, the indication added to the rule usage log might be usable to identify circumstances where a rule is frequently shadowed or only shadowed, which might counsel for modification or disabling of the rule under certain circumstances.

In step 309, the computing device may determine whether to disable one or more rules. Rules might be disabled if, for example, the process described with respect to step 305, step 306, and/or 307 suggests that the rules are unused, only shadowed, or the like. As such, the inquiry to step 309 may involve determining whether removal of the rule would adversely impact the security policy of a security group: if not, then the rule should likely be removed so as to remove a potential attack vector that is unused by legitimate traffic. If the computing device decides to disable one or more rules, the method 300 proceeds to step 310. Otherwise, the method 300 ends.

As indicated above, as part of step 309, the computing device may determine whether one or more rules are unused. A rule might be determined to be unused if none of the indications of the rules added in step 305 include the rule, and/or if the rule usage log generated in step 306 indicates that the rule was never used with respect to any of the log entries. For example, the computing device may determine, based on the modified first log, a first security group rule of the plurality of security group rules that is not associated with any log entry of the plurality of log entries.

In step 310, the computing device may disable one or more rules. Disabling one or more rules may comprise deleting the one or more rules, causing the one or more rules to be no longer applied, or the like. This step may include disabling one or more unused rules and/or one or more shadowed rules. For example, the computing device may based on the indication that the second security group rule is shadowed by the third security group rule, disable the second security group rule. Before a rule is disabled, one or more stakeholders associated with the rule may be notified. Those stakeholders might be provided some period of time (e.g., one day) to reject disabling of the one or more rules. Additionally and/or alternatively, the one or more stakeholders may be required to affirmatively consent to disabling of the one or more rules. Disabling a rule may comprise a variety of actions, such as deleting it from the rules database 202d, modifying the rule so as to no longer be applied to the security group, or the like. Note that some environments, such as Amazon Web Services, might presently only support deletion of a rule.

Stakeholders may be involved in the disabling process described with respect to step 310 for a variety of reasons. For example, stakeholder consent to disable a rule may be required because rules might be important albeit infrequently used and/or because stakeholders might want to preserve the rule for future use. As a particular example, a relatively new rule might be unused simply because it is new (and the appropriate traffic has not yet been received in a flow) and/or because the traffic it is intended to filter is infrequently received.

As part of step 310, the one or more rules may be partially disabled. For example, a first rule of the one or more rules may specify multiple ranges of IP addresses, and the rule might be partially disabled such that only a portion of the multiple ranges of IP addresses are deleted. This approach might be particularly valuable because it avoids inadvertently disabling otherwise useful rules.

In addition and/or as an alternative to step 310, the computing device may automatically modify one or more rules. For example, if a rule is constantly shadowed but occasionally used, that may suggest that the rule is undesirably broad and thus should be limited in scope to the circumstances it is occasionally used. Assume, for example, a rule specifies that packets from ports 20-30 should always be allowed, but that rule is constantly shadowed by rules except in the circumstance where it is used to allow packets from port 21. In such a circumstance, the computing device may automatically modify the rule to allow only packets from port 21, thereby removing potential attack vectors (e.g., from ports 20 and 22-30).

Figure 4:
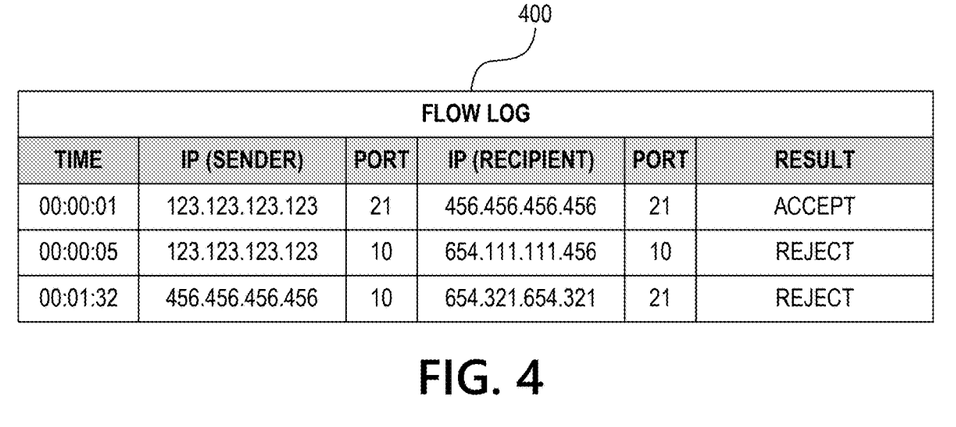
FIG. 4 shows an example of a flow log.

FIG. 4 shows an example of a flow log 400, such as might have been received as part of step 301 of FIG. 3. Such a flow log may comprise, for example, a VPC Flow Log such as is provided by Amazon Web Services. The flow log shows various entries of flows between a sender and a recipient. For example, as shown by the flow log 400, a transmission at 00:00:01 from 123.123.123.123:21 and to 456.456.456.456:21 was allowed, whereas a transmission at 00:00:005 from 123.123.123.123:10 and to 654.111.111.456:10 was rejected and a transmission at 00:01:32 from 456.456.456.456:10 to 654:321.654.321:21 was rejected.

Though termed a flow log throughout this description, the present disclosure need not be limited to packet flows. For example, the present disclosure is equally applicable to packet logs, which log each packet and, e.g., whether such a packet was allowed to reach its destination or not. Flow logs can in some ways be easier to process because they tend to be less voluminous than packet logs; however, the processes depicted herein are equally applicable to both.

Figure 5A:
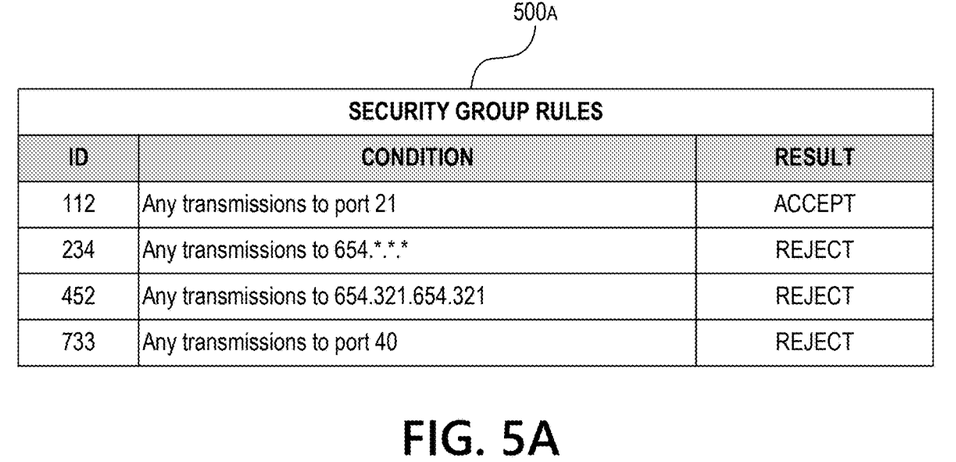
FIG. 5A shows an example of a list of security group rules.

FIG. 5A shows an example of a list of security group rules 500*a*, such that might have been determined as part of step 302 of FIG. 3. This list is unsorted, and reflects the sort of security group rules that might be stored in a database such as the rules database 202*d*. For example, a first rule (ID 112) allows any transmissions to port 21, a second rule (ID 234) rejects any transmissions to 654.*.*.*, a third rule (ID 452) rejects any transmissions to 654.321.654.321, and a fourth rule (ID 733) rejects any transmissions to port 40.

Figure 5B:
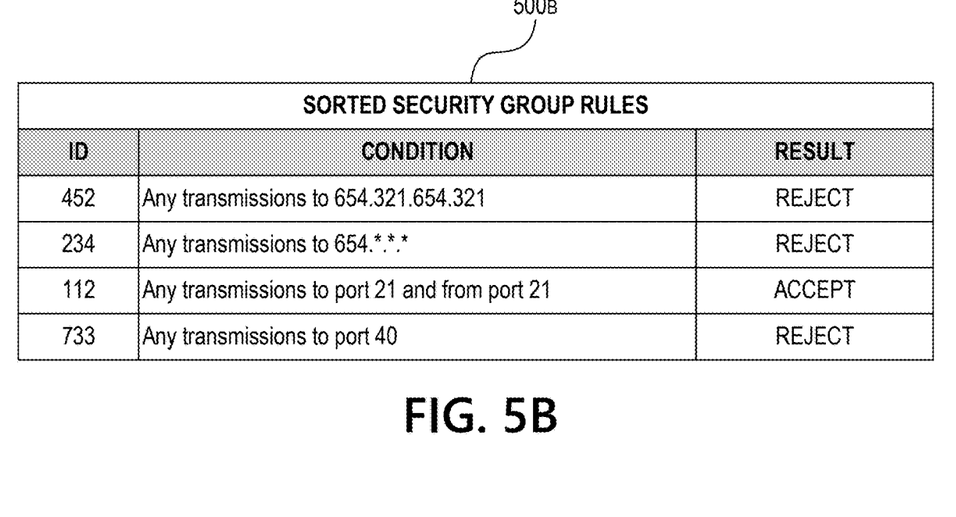
FIG. 5B shows an example of a sorted list of security group rules.

FIG. 5B shows an example of a sorted list of security group rules 500*b*, such as may have been generated as part of step 303 of FIG. 3. This list has been ordered based on permissiveness and specificity. Specifically, the first rule listed (ID 452) rejects any transmissions to 654.321.654.321, the second rule listed (ID 234) rejects any transmissions to 654.*.*.*, the third rule listed (ID 112) allows any transmissions to port 21, and the fourth rule listed (ID 733) rejects any transmissions to port 40.

Figure 6:
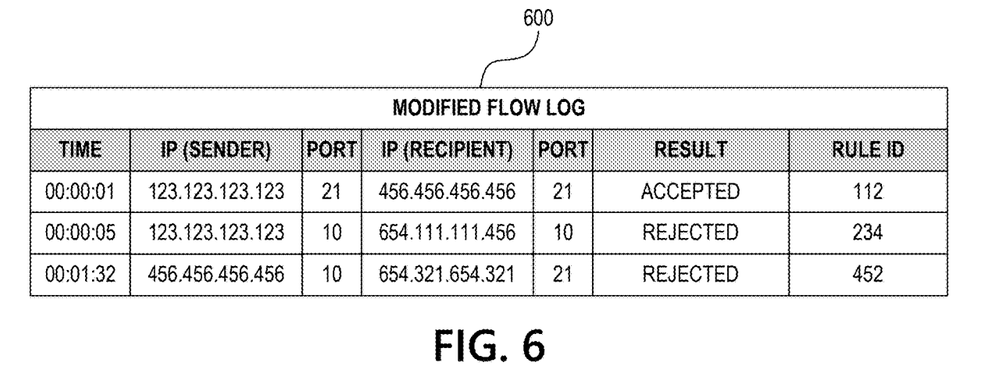
FIG. 6 shows an example of a modified flow log.

FIG. 6 shows an example of a modified flow log 600, such as might have been generated as part of step 305 of FIG. 3. Relative to the flow log 400 of FIG. 4, the modified flow log 600 has rule IDs appended such that the modified flow log 600 indicates the least permissive/most specific rule applicable to each entry in the flow log 400. For example, the flow log entry at 00:00:01 corresponds to rule ID 112, the flow log entry at 00:00:05 corresponds to rule ID 234, and the flow log entry at 00:01:32 corresponds to rule ID 452.

Figure 7:
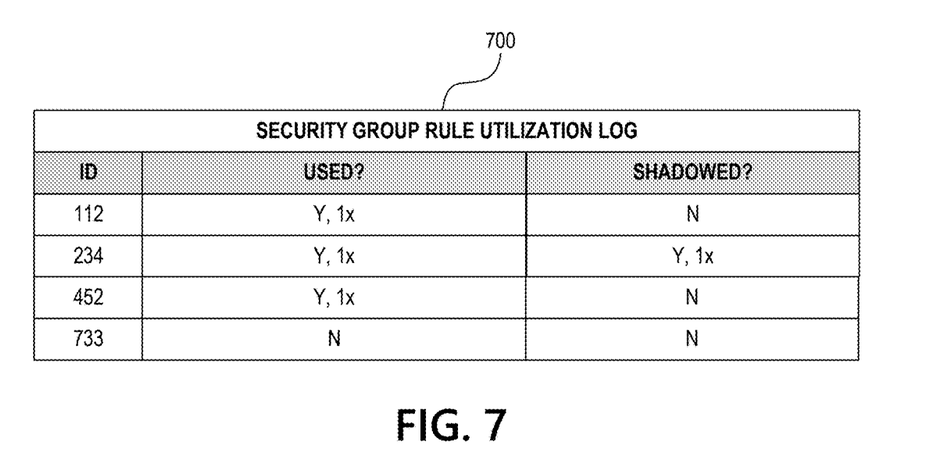
FIG. 7 shows an example of a security group rule utilization log.

FIG. 7 shows an example of a security group rule utilization log 700, such as might have been generated as part of step 306 of FIG. 3. The security group rule utilization log 700 indicates, for each of the rules (e.g., each of the rules of the sorted list of security group rules 500*b*), whether it was used and/or shadowed. Such information may be determined by counting occurrences of each rule in the modified flow log 600. For example, the security group rule utilization log 700 shows that the rule having ID 112 was used once and never shadowed, that the rule having ID 234 was used once and shadowed once, that the rule having ID 452 was used once and never shadowed, and that the rule having ID 733 was neither used nor shadowed.

In the example illustrated in FIG. 7, many actions may be taken by the computing device. For example, the rule having ID 733 might be disabled, as described with respect to step 310 of FIG. 3. As another example, recognizing that the rule having ID 234 was shadowed but used once, the conditions of the rule might be modified to continue to be applicable but to no longer be shadowed.

An analysis of the rule with ID 234 illustrates how rules can be shadowed. As indicated previously the rule having ID 234 rejects any transmissions to 654.*.*.*. This is why, for example, the flow log entry at 00:01:32 (which involved data sent to 654.321.654.321) was rejected. That said, with respect to the flow log entry at 00:01:32, it is superseded by the (more restrictive and more specific) rule having ID 452, which rejects any transmissions to 654.321.654.321. As such, the computing device may automatically modify the rule having ID 234 to reject all transmissions to 654.321.654.321, making it significantly more specific. With that said, such a decision might not be strictly necessary: because the rule with ID 234 defaults to rejecting too much, it does not leave open any potential attack vectors and thus might safely be left alone. In contrast, if the rule with ID 234 was a rule that allowed packets that happened to be too broad, then the computing device might more readily modify the rule to a narrower range of IP addresses, as doing so would lessen the potential attack vectors available to malicious parties.

Figure 8:
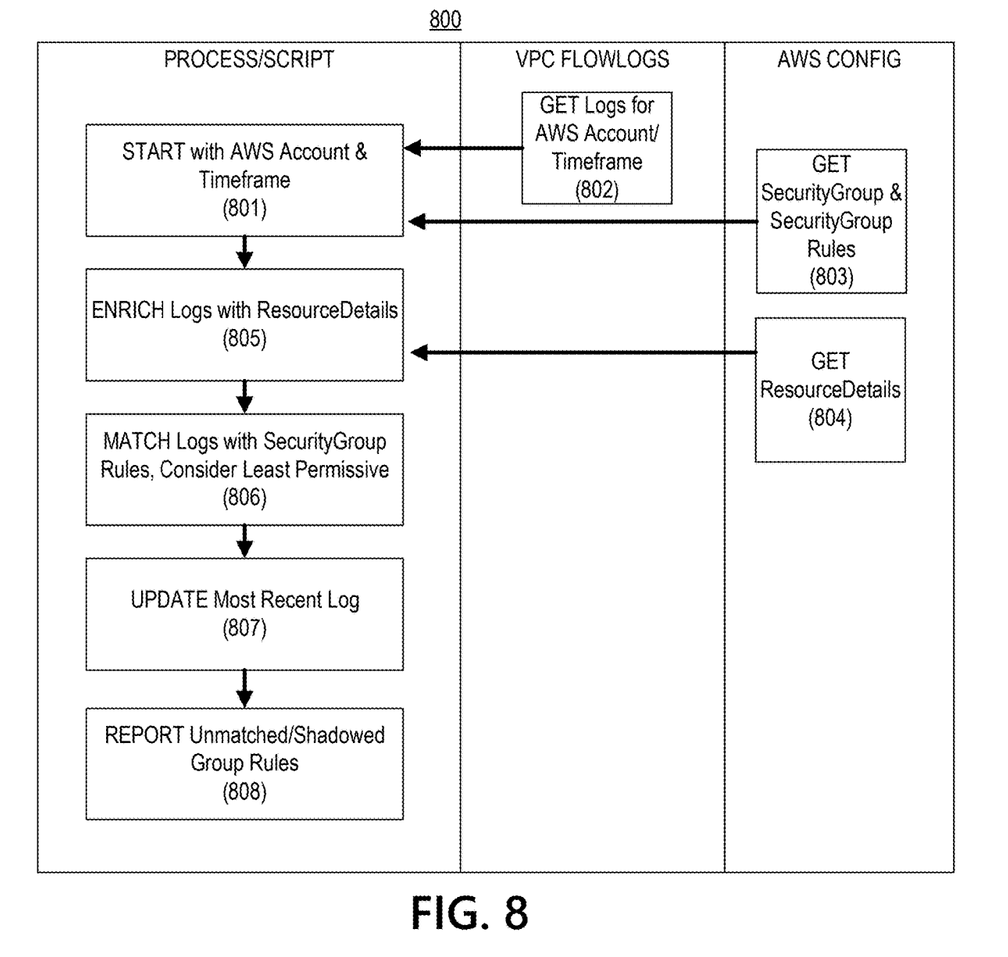
FIG. 8 shows an example of a process flow comprising steps which may be performed to automatically manage security group rules in an Amazon Web Services cloud environment.

FIG. 8 shows an example of a process flow 800 comprising steps which may be performed to automatically manage security group rules in an Amazon Web Services (AWS) cloud environment. Many of the steps of the process flow 800 are the same or similar as described with respect to FIG. 3, albeit characterized somewhat differently given the particularities of the AWS environment. A computing device may comprise one or more processors and memory storing instructions that, when executed by the one or more processors, cause performance of one or more of the steps of FIG. 8. One or more non-transitory computer-readable media may store instructions that, when executed by one or more processors of a computing device, cause the computing device to perform one or more of the steps of FIG. 8. Additionally and/or alternatively, one or more of the devices depicted in FIG. 2, such as the one or more servers 201 and/or the one or more user devices 203, may be configured to perform one or more of the steps of FIG. 8. For simplicity, the steps below will be described as being performed by a single computing device; however, this is merely for simplicity, and any of the below-referenced steps may be performed by a wide variety of computing devices, including multiple computing devices.

In step 801, the computing device may start with an AWS account and timeframe. In the example provided by the process flow 800, a user identifies a particular AWS account (e.g., for a particular business or line of business) and a particular timeframe (e.g., last month, last year). The AWS account itself will be used to identify security groups and entitle access to various information about those security groups, whereas the timeframe may be used to limit the scope of inquiry in the logs to a particular timeframe.

In step 802, the computing device may get logs for the relevant AWS account and timeframe. As part of this process, the computing device may query AWS resources for flow logs within the timeframe determined in step 801. This step may be the same or similar as step 301 of FIG. 3.

In step 803, the computing device may get security group information, including security group rules. In this manner, the computing device may receive, from AWS, information about the rules governing transmissions to/from a particular security group. This step may be the same or similar as step 302 of FIG. 3.

In step 804, the computing device may get resource details. In the context of an AWS implementation of the present disclosure, this may include information about particular security groups, data transmissions, or the like.

In step 805, the computing device may enrich the logs with resource details. This may include appending, to the logs, the resource details received in step 804.

In step 806, the computing device may match the logs with security group rules, prioritizing the least permissive rules. In this manner, the computing device may determine, for each entry in the enriched log, which rule(s) apply to the corresponding entry. This step may be the same or similar as step 304 of FIG. 3.

In step 807, the computing device may update the logs. This process may entail appending, to the enriched logs, information indicating which rule(s) apply to a corresponding log entry. This step may be the same or similar as step 305 of FIG. 3.

In step 808, the computing device may report unmatched and/or shadowed security group rules. Such reporting might be via a user interface, such as may be displayed by the interface application 204 executing on the one or more user devices 203. This step may be the same or similar as step 307, step 308, step 309, and/or step 310 of FIG. 3.

Figure 9:
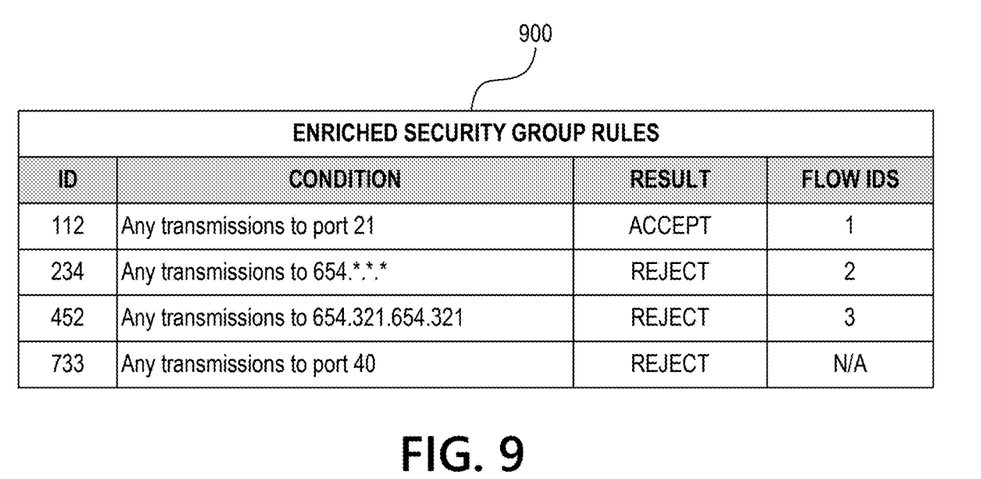
FIG. 9 shows an example of an enriched list of security group rules.

FIG. 9 shows an example of an enriched list of security group rules. As indicated above, rather than generating a modified flow log (as depicted in FIG. 6), rules themselves may be enriched with, for example, identifications of corresponding flow log entries. Such an enriched list of security group rules may be used in a manner substantially similar to that of the modified flow log: that is, it might be used to generate a rule usage log and determine, as applicable, shadowed rules.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to automatically manage security group rules in a cloud environment by analyzing utilization of each of the security group rules based on packet logs so as to reduce attack vector possibilities, the computing device comprising:
   one or more processors; and
   memory storing instructions that, when executed by the one or more processors, cause the computing device to:
      receive, from a log database, a first log comprising a plurality of log entries that each indicate one or more packet flows associated with a security group in the cloud environment;
      determine a plurality of security group rules for the security group of the cloud environment, wherein the plurality of security group rules limit one or both of:
         inbound network traffic for the security group, or
         outbound traffic for the security group;
      sort the plurality of security group rules into an order based on a permissiveness of the plurality of security group rules;
      identify, for each log entry of the plurality of log entries, a corresponding security group rule of the plurality of security group rules by iteratively processing, based on the order, the sorted plurality of security group rules to identify a least permissive security group rule that permitted a packet flow corresponding to the log entry;
      modify each of the plurality of security group rules to add, for each security group rule of the plurality of security group rules, an identification of a corresponding log entry;
      determine, based on the modified plurality of security group rules, a first security group rule of the plurality of security group rules that is not associated with any log entry of the plurality of log entries; and
      delete the first security group rule.

2. The computing device of claim 1, wherein the instructions, when executed by the one or more processors, cause the computing device to:
   determine, based on the modified plurality of security group rules, a second log that indicates, for each of the plurality of security group rules, whether a corresponding security group rule was indicated in the first log.

3. The computing device of claim 2, wherein the instructions, when executed by the one or more processors, cause the computing device to:
   determine, based on the modified plurality of security group rules, a second security group rule of the plurality of security group rules that is more permissive than a third security group rule of the plurality of security group rules;
   determine that both the second security group rule and the third security group rule correspond to a first log entry; and
   add, to the second log, an indication that the third security group rule is shadowed by the second security group rule.

4. The computing device of claim 3, wherein the instructions, when executed by the one or more processors, cause the computing device to:
   based on the indication that the second security group rule is shadowed by the third security group rule, delete the second security group rule.

5. The computing device of claim 1, wherein the instructions, when executed by the one or more processors, cause the computing device to:
   receive a second log comprising a second plurality of log entries that each indicate one or more packet flows associated with a plurality of different security groups in the cloud environment; and
   process log data to identify the first log.

6. The computing device of claim 1, wherein the instructions, when executed by the one or more processors, cause the computing device to receive the first log by causing the computing device to retrieve, from an Elastic Network Interface (ENI) of a Virtual Private Cloud (VPC), the first log, and wherein each of the one or more packet flows are associated with data transmissions associated with the VPC.

7. The computing device of claim 1, wherein the instructions, when executed by the one or more processors, cause the computing device to determine the plurality of security group rules for the security group by querying a database for rules associated with the security group.

8. A method configured to automatically manage security group rules in a cloud environment by analyzing utilization of each of the security group rules based on packet logs so as to reduce attack vector possibilities, the method comprising:
   receiving, from a log database, a first log comprising a plurality of log entries that each indicate one or more packet flows associated with a security group in the cloud environment;
   determining a plurality of security group rules for the security group of the cloud environment, wherein the plurality of security group rules limit one or both of:
      inbound network traffic for the security group, or
      outbound traffic for the security group;
   sorting the plurality of security group rules into an order based on a permissiveness of the plurality of security group rules;
   identifying, for each log entry of the plurality of log entries, a corresponding security group rule of the plurality of security group rules by iteratively processing, based on the order, the sorted plurality of security group rules to identify a least permissive security group rule that permitted a packet flow corresponding to the log entry;
   modifying each of the plurality of security group rules to add, for each security group rule of the plurality of security group rules, an identification of a corresponding log entry;
   determining, based on the modified plurality of security group rules, a first security group rule of the plurality of security group rules that is not associated with any log entry of the plurality of log entries; and disabling the first security group rule.

9. The method of claim 8, further comprising:

determining, based on the modified plurality of security group rules, a second log that indicates, for each of the plurality of security group rules, whether a corresponding security group rule was indicated in the first log.

10. The method of claim 9, further comprising:

determining, based on the modified plurality of security group rules, a second security group rule of the plurality of security group rules that is more permissive than a third security group rule of the plurality of security group rules;

determining that both the second security group rule and the third security group rule correspond to a first log entry; and adding, to the second log, an indication that the second security group rule is shadowed by the third security group rule.

11. The method of claim 10, further comprising:

based on the indication that the second security group rule is shadowed by the third security group rule, disabling the second security group rule.

12. The method of claim 8, further comprising:

receiving a second log comprising a second plurality of log entries that each indicate one or more packet flows associated with a plurality of different security groups in the cloud environment; and processing log data to identify the first log.

13. The method of claim 8, wherein the receiving the first log comprises retrieving, from an Elastic Network Interface (ENI) of a Virtual Private Cloud (VPC), the first log, and wherein each of the one or more packet flows are associated with data transmissions associated with the VPC.

14. The method of claim 8, wherein the determining the plurality of security group rules for the security group comprises querying a database for rules associated with the security group.

15. One or more non-transitory computer-readable media storing instructions configured to automatically manage security group rules in a cloud environment by analyzing utilization of each of the security group rules based on packet logs so as to reduce attack vector possibilities, wherein the instructions, when executed by one or more processors of a computing device, cause the computing device to:

receive, from a log database, a first log comprising a plurality of log entries that each indicate one or more packet flows associated with a security group in the cloud environment;

determine a plurality of security group rules for the security group of the cloud environment, wherein the plurality of security group rules limit one or both of: inbound network traffic for the security group, or outbound traffic for the security group;

sort the plurality of security group rules into an order based on a permissiveness of the plurality of security group rules;

identify, for each log entry of the plurality of log entries, a corresponding security group rule of the plurality of security group rules by iteratively processing, based on the order, the sorted plurality of security group rules to identify a least permissive security group rule that permitted a packet flow corresponding to the log entry;

modify each of the plurality of security group rules to add, for each security group rule of the plurality of security group rules, an identification of a corresponding log entry;

determine, based on the modified plurality of security group rules, a first security group rule of the plurality of security group rules that is not associated with any log entry of the plurality of log entries; and disable the first security group rule.

16. The one or more non-transitory computer-readable media of claim 15, wherein the instructions, when executed by the one or more processors, cause the computing device to:

determine, based on the modified plurality of security group rules, a second log that indicates, for each of the plurality of security group rules, whether a corresponding security group rule was indicated in the first log.

17. The one or more non-transitory computer-readable media of claim 16, wherein the instructions, when executed by the one or more processors, cause the computing device to:

determine, based on the modified plurality of security group rules, a second security group rule of the plurality of security group rules that is more permissive than a third security group rule of the plurality of security group rules;

determine that both the second security group rule and the third security group rule correspond to a first log entry; and add, to the second log, an indication that the second security group rule is shadowed by the third security group rule.

18. The one or more non-transitory computer-readable media of claim 17, wherein the instructions, when executed by the one or more processors, cause the computing device to:

based on the indication that the second security group rule is shadowed by the third security group rule, delete the second security group rule.

19. The one or more non-transitory computer-readable media of claim 15, wherein the instructions, when executed by the one or more processors, cause the computing device to:

receive a second log comprising a second plurality of log entries that each indicate one or more packet flows associated with a plurality of different security groups in the cloud environment; and process log data to identify the first log.

20. The one or more non-transitory computer-readable media of claim 15, wherein the instructions, when executed by the one or more processors, cause the computing device to receive the first log by causing the computing device to retrieve, from an Elastic Network Interface (ENI) of a Virtual Private Cloud (VPC), the first log, and wherein each of the one or more packet flows are associated with data transmissions associated with the VPC.

* * * * *